United States Patent [19]

Brown et al.

[11] Patent Number: 5,512,612
[45] Date of Patent: Apr. 30, 1996

[54] PRESSURE SENSITIVE ADHESIVE EMPLOYING A WATER-DISPERSIBLE POLYMER AND ARTICLES MADE THERE FROM

[75] Inventors: Mary L. Brown, St. Paul; Richard J. Goetz, Woodbury; Cheryl L. Moore, Afton; Donald R. Battles, Arden Hills, all of Minn.

[73] Assignee: Minnesota Mining and Manufacturing Company, St. Paul, Minn.

[21] Appl. No.: 222,458

[22] Filed: Apr. 4, 1994

[51] Int. Cl.$^6$ .......................... C08K 7/22; C08F 265/06; C08F 20/10; C08F 267/06
[52] U.S. Cl. .......................... 523/218; 523/223; 525/221; 525/223; 525/228; 525/301; 525/330.6
[58] Field of Search .................................. 523/218, 221, 523/223; 525/221, 223, 228, 301, 330.6

[56] References Cited

U.S. PATENT DOCUMENTS

| | | | |
|---|---|---|---|
| 3,857,731 | 12/1974 | Merrill, Jr. et al. | 117/122 PA |
| 3,890,292 | 6/1975 | Bohme et al. | 525/330.6 |
| 4,077,926 | 3/1978 | Sanderson et al. | 525/301 |
| 4,656,218 | 4/1987 | Kinoshita | 524/460 |
| 4,735,837 | 4/1988 | Miyasaka et al. | 428/40 |
| 4,855,170 | 8/1989 | Darvell et al. | 428/40 |
| 4,994,322 | 2/1991 | Delgado et al. | 428/343 |
| 5,118,750 | 6/1992 | Silver et al. | 524/462 |
| 5,196,504 | 3/1993 | Scholz et al. | 526/318.4 |
| 5,266,402 | 11/1993 | Delgado | 428/355 |
| 5,281,288 | 1/1994 | Murray et al. | 156/83 |
| 5,288,359 | 2/1994 | Stobbie, IV et al. | 156/294 |
| 5,429,703 | 7/1995 | Hartman et al. | 156/294 |

FOREIGN PATENT DOCUMENTS

| | | |
|---|---|---|
| 0546746 | 6/1993 | European Pat. Off. . |
| 4-248887 | 9/1992 | Japan . |
| WO86/03767 | 7/1986 | WIPO . |
| WO93/02855 | 2/1993 | WIPO . |
| WO93/09195 | 5/1993 | WIPO . |
| WO94/13751 | 6/1994 | WIPO . |

*Primary Examiner*—Peter A. Szekely
*Attorney, Agent, or Firm*—Gary L. Griswold; Walter N. Kirn; James V. Lilly

[57] ABSTRACT

A pressure sensitive adhesive that employs a water-dispersible polymer is provided. In one embodiment of the invention the adhesive comprises microparticles and the water-dispersible component. In another embodiment the adhesive comprises a novel water-dispersible polymer that contains a plurality of poly(alkoxyalkyl) acrylate units as a major component.

The pressure sensitive adhesive may be provided as a tape and used with labels for containers, sterilization indicator tapes and labels, closure systems for envelopes, surgical wrappers, and mammalian body coverings. It may also be used in the preparation of paper web splices.

In one embodiment of the invention the tape is repulpable. In another embodiment it is launderable.

30 Claims, No Drawings

5,512,612

PRESSURE SENSITIVE ADHESIVE EMPLOYING A WATER-DISPERSIBLE POLYMER AND ARTICLES MADE THERE FROM

FIELD OF THE INVENTION

This invention relates to pressure sensitive adhesives and articles made therefrom.

BACKGROUND OF THE INVENTION

Pressure sensitive adhesives (PSAs) have gained wide spread acceptance in many applications. These adhesives are characterized by being normally tacky at room temperature (e.g., 20° C.) and forming a bond to a surface by the application of, at most, very light finger pressure. They possess a balance of viscoelastic and elastic properties which result in a four-fold balance of adhesion, cohesion, stretchiness and elasticity. They have sufficient cohesiveness and elasticity so that they can be handled and removed from surfaces without leaving a residue even though they are tacky. PSAs do not embrace compositions merely because they are sticky or adhere to a surface.

Microparticle-containing PSAs represent one category of PSAs. This category of PSAs contains a plurality of microparticles which may or may not be inherently pressure sensitive and may or may not be hollow. Microparticle-containing PSAs may also include a binder to assist in securing the particles to a substrate. The binder may be inherently pressure sensitive if desired. Examples of these PSAs are disclosed in the art. For example, see U.S. Pat. No. 3,857,731 (Merrill et al), U.S. Pat. No. 4,656,218 (Kinoshita), U.S. Pat. No. 4,735,837 (Miyasaka et al), U.S. Pat. No. 4,855,170 (Darvall et al), U.S. Pat. No. 4,994,322 (Delgado et al), U.S. Pat. No. 5, 118,750 (Silver et al), and WO 93/02855 (Mallya et al). The adhesives disclosed in these references are not water-dispersible. They agglomerate and form tacky globules when attempts are made to repulp them. The globules, commonly referred to as "stickies" in the art, plug screens used in the repulping process and lead to increased manufacturing time and expense. Additionally, any globules that are not removed by screening adversely affect the quality of the paper product resulting from such recycling efforts. As a result a need exists for a water-dispersible pressure sensitive microparticle adhesive that can be readily repulped.

SUMMARY OF THE INVENTION

The present invention overcomes the disadvantages of the prior art. In one aspect of the invention it provides a normally tacky pressure sensitive adhesive composition made up of a blend of:

A) a polymeric, solvent insoluble but solvent dispersible microparticle component; and B) a water-dispersible polymeric component.

The microparticle component comprises from 0.1 to 99.9 parts by weight of the adhesive composition. The water-dispersible component correspondingly comprises from 99.9 to 0.1 parts by weight of the adhesive composition.

In another aspect of the invention there is provided a water-dispersible pressure sensitive adhesive composition that comprises the product of the emulsion polymerization product of A) from about 50 to 98 parts by weight, preferably from about 80 to 95 parts by weight, of a poly(alkoxyalkyl) acrylate; and correspondingly B) from about 50 to 2 parts by weight, preferably from about 20 to 5 parts by weight, of a carboxylic acid.

These polymers, which contain primarily poly(alkoxyalkyl) acrylate units are pressure sensitive in and of themselves.

The adhesive composition of the invention is preferably water-dispersible. It has improved performance in one or more of tack, adhesion, and humidity resistance when compared to the compositions of the prior art. It may be provided either in bulk form or as a PSA sheet of any desired width, that is as a narrow strip or a tape or as a wide film. In either case, the pressure sensitive sheet comprises a thin layer (typically less than 125μ thick. Additionally, the adhesive layer may be provided on one or more opposed surfaces of a flexible support. If the adhesive layer is strippably bonded to the support, the resulting product is an adhesive transfer tape. If the adhesive is essentially permanently bonded to the support, the support is referred to herein as a backing.

The adhesive film of the present invention is useful in a variety of applications. For example, it can be used in the manufacture of repulpable paper splices (both permanent and temporary). Additionally, such adhesives can be used with labels for containers, sterilization indicator tapes and labels, closure systems for containers such as envelopes, closure systems for surgical wrappers, and mammalian body coverings (e.g., surgical gowns, sheets, drapes and the like). Other uses for the adhesive and tape of the invention will be apparent to those skilled in the art as a result of this disclosure.

As used throughout this specification, the following terms have the following meanings:

"Water-dispersible" means that the particular material is capable of passing either the TAPPI test UM-213 or the Laundering Test each of which is described in more detail below.

"Blend" means to a physical combination of the microparticles and the water-dispersible polymeric component. The components are not covalently bonded to one another although they may be associated via hydrogen bonding.

DETAILED DESCRIPTION

The Microparticle Component

The microparticle component useful in the invention is comprised of polymeric, elastomeric, solvent insoluble but solvent dispersible microparticles. These spheres may be inherently pressure sensitive if desired, although they need not be so. Additionally, a crosslinker may be added if desired. As manufactured, the microparticles are generally spheroidal in shape. They typically have an average diameter in the range of from 1 to 300 (preferably from 1 to 50) μ. The microparticles used in the invention may be solid or hollow. Hollow microparticles may contain more than one void. Typically, the hollow or void portion of the microparticles is less than 100 μm in average diameter.

The microparticles may be prepared by various emulsification processes. For example the microparticles may be obtained via suspension polymerization such as the following "two-step" emulsification polymerization process comprising the steps of:

a) forming (i) forming a water-in-oil emulsion by mixing an aqueous solution of polar monomer(s) with oil phase monomer(s), the oil phase monomer(s) being selected from alkyl (meth)acrylate esters and vinyl esters; and (ii) forming a water-in-oil-in-water emulsion by dispersing the water-in-oil emulsion into an aqueous phase; and b) initiating polymerization, preferably by application of heat or radiation.

In this process, the first step preferably involves forming a water-in-oil emulsion of an aqueous solution of monomer(s) (at least some of which is a polar monomer) in an oil phase monomer, i.e., at least one (meth)acrylate or vinyl ester monomer, with optional free radically reactive hydrophilic oligomers and/or polymers, using an emulsifier having a low hydrophilic-lipophilic balance (HLB) value. Suitable emulsifiers are those having an HLB value below about 7, preferably in the range of about 2 to about 7. Examples of such emulsifiers include sorbitan monooleate, sorbitan trioleate, and ethoxylated oleyl alcohol such as Brij™ 93, available from Atlas Chemical Industries, Inc.

In the first phase of the first step, oil phase monomer(s), emulsifier, a free radical initiator, and, optionally, tree radically reactive hydrophilic oligomer and/or polymer, and, optionally, a crosslinking monomer or monomers as defined below are combined, and an aqueous solution of all or a portion of the polar monomer(s) is agitated and poured into the oil phase mixture to form a water-in-oil emulsion. The free radically reactive hydrophilic oligomer and/or polymer, may be added to either the oil phase or the water phase. A thickening agent, e.g., methyl cellulose may also be included in the aqueous phase of the water-in-oil emulsion. In the second phase of the first step, a water-in-oil-in-water emulsion is formed by dispersing the water-in-oil emulsion of the first step into an aqueous phase containing an emulsifier having an HLB value above about 6. The aqueous phase may also contain any portion of the polar monomer(s) which was not added in step one. Examples of such emulsifiers include ethoxylated sorbitan monooleate; ethoxylated lauryl alcohol; and alkyl sulfates. In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy & Biology*, (D. Attwood and A. T. Florence, Chapman & Hall Limited, New York, 1983). If the water-in-oil-in-water emulsion is stable, then hollow or multi-void microparticles will be formed.

The second, or final process step to this method involves the application of heat or radiation to initiate polymerization of the monomers. Useful initiators are those which are normally suitable for free radical polymerization of acrylate or vinyl ester monomers and which are oil soluble and of very low solubility in water. However, when the polar monomer is N-vinyl pyrrolidone, the use of benzoyl peroxide as the initiator is recommended. Examples of such initiators include azo compounds, hydroperoxides, peroxides, and the like, and photoinitiators such as benzophenone, benzoin ethyl ether, and 2,2-dimethoxy-2-phenyl acetophenone.

Use of a water soluble polymerization initiator causes formation of substantial amounts of latex. The extremely small particle size of latex particles renders any significant formation of latex undesirable. The initiator is generally used in an amount ranging from about 0.01 percent up to about 10 percent by weight of the total polymerizable composition, preferably up to about 5 percent.

Microparticles may also be prepared by a simpler ("one-step") emulsification process comprising aqueous suspension polymerization of at least one alkyl (meth)acrylate ester monomer or vinyl ester monomer and, optionally, at least one polar monomer in the presence of at least one emulsifier which is capable of producing a water-in-oil emulsion inside the droplets, which is substantially stable during emulsification and polymerization. In this process the aqueous suspension optionally, and preferably, also includes a free radically reactive hydrophilic oligomer and/or polymer.

As in the two-step emulsification process, the emulsifier is utilized in concentrations greater than its critical micelle concentration. Examples of such emulsifiers include alkylaryl ether sulfates such as sodium alkylaryl ether sulfate, e.g., Triton™ W/30, available from Rohm and Haas; alkylaryl poly(ether) sulfates such as alkylaryl poly(ethylene oxide) sulfates, preferably those having up to about 4 ethoxy repeat units; and alkyl sulfates, such as sodium lauryl sulfate, ammonium lauryl sulfate, triethanolamine lauryl sulfate, and sodium hexadecyl sulfate; alkyl ether sulfates such as ammonium lauryl ether sulfate; and alkyl poly(ether) sulfates, such as alkyl poly(ethylene oxide) sulfates, preferably those having up to about 4 ethoxy units. Alkyl sulfates; alkyl ether sulfates; alkylaryl ether sulfates; and mixtures thereof are preferred as they provide a maximum void volume per microparticle for a minimum amount of surfactant. Nonionic emulsifiers, e.g., Siponic™ Y-500-70 (ethoxylated oleyl alcohol, available from Alcolac, Inc.); and PLURONIC® P103 (a block copolymer of poly(propylene oxide) and poly(ethylene oxide), available from BASF Corporation) can be utilized alone or in conjunction with anionic emulsifiers. Polymeric stabilizers may also be present but are not necessary.

Both the "two-step" and "one-step" methods produce an aqueous suspension of monomer droplets. Upon polymerization the droplets become microparticles. The majority of the microparticles have interior cavities that, upon drying, become voids.

Another process which may be used to prepare the microparticles forms an oil-in-water emulsion and then disperses the emulsion into an aqueous phase. The aqueous phase comprises at least one alkyl (meth)acrylate ester monomer or vinyl ester monomer, and optionally a free radically reactive hydrophilic oligomer and/or polymer. This process employs a suspension stabilizer rather than an emulsifier. As a result, this process forms monomer droplets which have no interior cavities. Upon polymerization, these droplets become solid microparticles.

Discrete polymeric microparticles may also be prepared via suspension polymerizations as disclosed in U.S. Pat. Nos. 3,691,140; 4,166,152; 4,636,432; 4,656,218; and 5,045,569 which all describe adhesive compositions.

Preparation of the microparticles of this invention may be modified by withholding the addition of all or part of the optional free radically reactive hydrophilic oligomer and/or polymer, and optionally polar monomers until after polymerization of the oil phase is initiated; however, the components must be added to the polymerizing mixture prior to 100% conversion.

The microparticles may be prepared from a number of materials. For example, alkyl acrylate and methacrylate monomers may be used to prepare the spheres. These monomers are monofunctional unsaturated acrylate and methacrylate esters of non-tertiary alkyl alcohols. The alkyl groups of these alcohols preferably contain from 4 to 14 carbon atoms. These acrylate monomers are oleophilic, water emulsifiable, have restricted water solubility, and as homopolymers, generally have glass transition temperatures below about −10° C. Examples of such monomers include but are not limited to those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

Preferred acrylate monomers include those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Acrylate or methacrylate or other vinyl monomers which, as homopolymers, have glass transition temperatures higher than about −10° to 0° C., e.g., tert-butyl acrylate, isobornyl acrylate, butyl methacrylate, vinyl acetate, acrylonitrile, mixtures thereof, and the like, may optionally be utilized in conjunction with one or more of the acrylate, methacrylate and vinyl ester monomers provided that the glass transition temperature of the resultant polymer is below about −10° C.

Vinyl ester monomers suitable for use in the microparticles include but are not limited to those selected from the group consisting of vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 14 carbon atoms which as homopolymers have glass transition temperatures below about −10° C. Preferred vinyl ester toohomers include those selected from the consisting of vinyl laurate, vinyl caprate, vinyl 2-ethylhexanoate, and mixtures thereof.

The polar monomers useful in preparing the microparticles are both somewhat oil soluble and water soluble, resulting in a distribution of the polar monomer between the aqueous and oil phases. Representative examples of suitable polar monomers include but are not limited to those selected from the group consisting of acrylic acid; methacrylic acid; iraconic acid; crotonic acid; maleic acid; fumaric acid; sulfoethyl methacrylate; and ionic monomers such as sodium methacrylate; ammonium acrylate; sodium acrylate; trimethylamine p-vinyl benzimide; N,N-dimethyl-N-(beta-methoxy-ethyl)ammonium propionate betaine; trimethylamine methacrylamide; 1,1-dimethyl-1-(2,3-dihydroxypropyl)amine methacrylamide; N-vinyl pyrrolidone; N-vinyl caprolactam; acrylamide; t-butyl acrylamide; dimethylamino ethyl acrylamide; N-octyl acrylamide; mixtures thereof, and the like. Preferred polar monomers include those selected from the group consisting of monoolefinic monocarboxylic acids; monoolefinic dicarboxylic acids; acrylamides; N-substituted acrylamides; salts thereof, and mixtures thereof. Examples of such monomers include but are not limited to those selected from the group consisting of acrylic acid; sodium acrylate; N-vinyl pyrrolidone; and mixtures thereof.

Optionally there may be included free radically reactive hydrophilic oligomers and/or polymers in the microparticles. These include but are not limited to those selected from the group consisting of poly(alkylene oxides) such as poly(ethylene oxide); poly(vinyl methyl ether); poly(acrylamide); poly-(N-vinyl pyrrolidone); poly(vinyl alcohol); and mixtures thereof.

Functionalized derivatives of free radically reactive hydrophilic oligomers and polymers useful in the microparticles include those selected from the group consisting of macromers of the general formula:

X—(Y)$_n$—Z wherein

X is a group that is tree radically copolymerizable with the free radically polymerizable monomer(s) and polar monomer(s);

Y is a divalent linking group;

n is an integer of 0 to 1;

Z is a monovalent hydrophilic polymeric or oligomeric moiety having a degree of polymerization greater than or equal to 2.

Examples of such macromonomers include but are not limited to those selected from the group consisting of acrylate and methacrylate functional oligomers and polymers, where X represents $H_2C{=}CR^1{-}$, where $R^1$ represents H or $CH_3$; Y is a divalent carboxyl group; n=1; and Z is a hydrophilic oligomeric or polymeric moiety having a degree of polymerization greater than or equal to 2. Such macromonomers also include but are not limited to p-styryl functional materials, X represents $H_2C{=}CR^1{-}$, where $R^1$ represents H or $CH_3$; Y represents

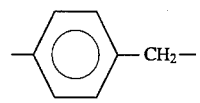

n=1; and Z is a hydrophilic oligomeric or polymeric moiety having a degree of polymerization greater than or equal to 2. Difunctional or multifunctional oligomers and polymers having more than one, X group radically copolymerizable with the tree radically copolymerizable monomers and polar monomers of the microparticles used in the present invention, such X groups either pendant from or terminating hydrophilic polymeric or oligomeric moiety Z, are also useful in the microparticles of the present invention.

Preferred macromonomers include these selected from the group consisting of acrylate terminated poly(ethylene oxide); methacrylate terminated poly(ethylene oxide); methoxy poly(ethylene oxide) methacrylate; butoxy poly(ethylene oxide) methacrylate; p-vinyl benzyl terminated poly-(ethylene oxide); acrylate terminated poly(ethylene glycol); methacrylate terminated poly(ethylene glycol); methoxy poly(ethylene glycol) methacrylate; butoxy poly(ethylene glycol) methacrylate, p-vinyl benzyl terminated poly(ethylene glycol); poly(ethylene oxide) diacrylate; poly(ethylene oxide) dimethacrylate; and mixtures thereof. These functionalized materials are preferred because they are easily prepared through well-known ionic polymerization techniques and are also highly effective in providing grafted hydrophilic segments along free radically polymerized acrylate polymer backbones.

Preferred macromonomers also include those selected from the group consisting of p-vinyl benzyl terminated poly(N-vinyl pyrrolidone); p-vinyl benzyl terminated poly-(acrylamide); methacrylate terminated poly(N-vinyl pyrrolidone); and mixtures thereof. These macromonomers may be prepared through the esterification reaction of a carboxy terminated N-vinyl pyrrolidone or acrylamide, beta-mercaptopropionic acid chain transfer agent, and chloromethyl styrene or methacryloyl chloride as described in a series of papers by M. Akashi et al. [Angew. Makromol. Chem., 132, 81 (1985); J. Appl. Polym. Sci., 39, 2027 (1990); J. Polym. Sci., Part A: Polym. Chem., 27, 3521 (1989] all incorporated by reference herein.

Preferably at least one polar monomer is included in the composition, but microparticles may also be prepared using alkyl acrylate, alkyl methacrylate and/or vinyl ester monomer(s) alone or in combination only with other vinyl free radically polymerizable monomers, e.g., vinyl acetate. However, when a methacrylate monomer alone is utilized, a crosslinking agent, must be included unless the hydrophilic component comprises more than one radically copolymerizable group X as defined in Formula I. Most preferably at least about 1 part to about 10 parts by weight polar monomer is included as this ratio provides microparticles with balanced PSA properties.

The composition from which the microparticles are made may also contain a multifunctional crosslinking agent. The term "multifunctional" as used herein refers to crosslinking agents which possess two or more free radically polymerizable ethylenically unsaturated groups. Useful multifunctional crosslinking agents include those selected from the group consisting of acrylic or methacrylic esters of diols such as butanediol diacrylate, triols such as glycerol, and tetrols such as pentaerythritol. Other useful crosslinking agents include those selected from the group consisting of polymeric multifunctional acrylates and methacrylates, e.g., poly(ethylene oxide) diacrylate or poly(ethylene oxide) dimethacrylate; polyvinylic crosslinking agents, such as substituted and unsubstituted divinylbenzene; and difunctional urethane acrylates, such as Ebecryl™ 270 and Ebecryl 230™ (1500 weight average molecular weight and 5000 weight average molecular weight acrylated urethanes, respectively—both available from Radcure Specialties), and mixtures thereof.

The microparticles useful in this invention are preferably comprised, based on 100 parts by weight total, of 100 parts or less of at least one free radically polymerizable monomer selected from the group consisting of alkyl acrylate esters, alkyl methacrylate esters, vinyl esters, and mixtures thereof; and optionally about 0 to about 30 parts by weight of one or more polar monomers; and optionally about 0 to about 40 parts by weight of at least one hydrophilic oligomer or polymer component.

Preferably the pressure sensitive microparticles comprise about 80 to about 98 parts of free radically polymerizable monomer selected from the group consisting of alkyl acrylate esters, alkyl methacrylate esters, vinyl esters, and mixtures thereof; and optionally about 1 to 17 parts of at least one polar monomer; and optionally about 1 to 18 parts of a hydrophilic oligomer or polymer component, based on 100 parts by weight total. Most preferably the pressure sensitive microparticles comprise about 87 to about 98 parts of free radically polymerizable monomer; and optionally about 1 to 8 parts of a polar monomer; and optionally about 1 to 5 parts of a hydrophilic oligomer or polymer component, based on 100 parts by weight total.

When a crosslinker is employed, it is typically employed at a level of up to about 10 equivalent weight percent. Above about 0.15 equivalent weight percent, of the total polymerizable microparticle composition, the microparticles become non-tacky. The "equivalent weight percent" of a given compound is defined as the number of equivalents of that compound divided by the total number of equivalents in the total (microparticle) composition, wherein an equivalent is the number of grams divided by the equivalent weight. The equivalent weight is defined as the molecular weight divided by the number of polymerizable groups in the monomer (in the case of those monomers with only one polymerizable group, equivalent weight=molecular weight). The crosslinker can be added at any time before 100% conversion to polymer of the monomers of said microparticle composition. Preferably it is added before initiation occurs.

The relative amounts of the above components are important to the properties of the resultant microparticle. Use of higher levels of a multifunctional crosslinker will result in nontacky microparticles. In such cases the water soluble, or dispersible, polymeric component must be tacky. In those cases where the water soluble, or dispersible, polymeric component is not itself tacky, it is necessary for the microparticle adhesive to be so.

The Water-Dispersible Polymeric Compound

The polymeric component useful in the invention comprises sufficient hydrophilic units capable of rendering the polymer water-dispersible. Preferably, the polymeric component contains functional groups which are capable of interacting with the microspheres. Such functional groups include, by way of example, hydroxyl groups, carboxyl groups, amino groups, sulfonyl groups, and the like. Adhesives of the invention which employ polymeric components with these types of functional groups have been found to exhibit improved shear strength.

A wide variety of water-dispersible materials are useful as the polymeric component in the invention. Non-limiting examples of these materials include those selected from the group consisting of surfactants such as poly(ethylene oxide) alkylphenyl ethers, such as those sold under the name IGEPAL® CO and IGEPAL® CA (available from Rhone-Poulenc, Inc.); poly(ethylene oxide) lauryl, cetyl, and oleyl ethers such as those sold under the name Brij® (available from ICI Americas, Inc.); poly(ethylene oxide) laurate; poly(ethylene oxide) oleate; sorbitan oleate; ethylene oxide/propylene oxide block copolymers such as those sold under the name PLURONIC® and TETRONIC® (available from BASF Corporation); and organic phosphate esters, such as Gafac® PE-510 (available from International Specialty Products).

Other water-dispersible polymers useful in the invention include those disclosed in U.S. Pat. No. 2,838,421, U.S. Pat. No. 3,441,430, U.S. Pat. No. 4,442,258, U.S. Pat. No. 3,890,292, and U.S. Pat. No. 5,196,504, and DE-C 23 11 76. Examples of such components include but are not limited to those selected from the group consisting of poly(acrylic acid); poly(vinyl alcohol); poly(N-vinyl pyrrolidone); poly(acrylamide); poly(alkoxyalkyl (meth)acrylates), such as 2-ethoxy ethyl acrylate, 2-ethoxy ethyl methacrylate, 2-(2-ethoxyethoxy) ethyl acrylate, and 2-methoxy ethyl acrylate (available from SARTOMER Company, Inc.); poly(vinyl methyl ether); poly(vinyl methyl ether:maleic anhydride), sold under the name Gantrez™ (available from International Specialty Products); poly(ether polyols), such as poly(propylene glycol) and the like, such as those sold under the name Sannix™ (available from Sanyo Chemical Industries); copolymers thereof, and the like. Copolymers of these and alkyl (meth)acrylate esters or vinyl esters are also suitable. Gums such as those derived from okra and guar may also be used.

A particularly useful water-dispersible polymer comprises the pressure sensitive emulsion polymers disclosed above. When the emulsion polymer is combined with the microparticles a pressure sensitive adhesive composition is produced which has optimal shear strength. These emulsion polymers comprise the polymerization product of a poly(alkoxyalkyl) acrylate, and a carboxylic acid. Additionally, an essentially water-insoluble alkyl acrylate and a copolymerizable emulsifier monomer may be included in the polymerization components. The alkyl acrylate typically comprises from 0 to 40 parts by weight, preferably 0 parts by weight, of the polymerization mixture. The emulsifier monomer typically comprises from 0 to 6 parts by weight, preferably 0 to 4 parts by weight, of the polymerization mixture.

Examples of poly(alkoxyalkyl) acrylates useful in preparing the emulsion polymer include but are not limited to those selected from 2-(2-ethoxyethoxy) ethyl acrylate, 2-ethoxyethyl acrylate, 2-methoxyethoxyethyl acrylate, 2-methoxyethyl methacrylate, polyethylene glycol monoacrylates and methacrylates, and the like.

Examples of carboxylic acids useful in preparing the emulsion polymer include but are not limited to those selected from acrylic acid, methacrylic acid, iraconic acid, crotonic acid, maleic acid, fumaric acid, beta-carboxyethyl acrylate, and the like.

Examples of alkyl acrylates useful in preparing the emulsion polymer include but are not limited to those selected from methyl(meth) acrylate, ethyl(meth) acrylate, n-butyl-(meth) acrylate, 2-methylbutyl acrylate, isoamyl acrylate, sec-butyl acrylate, isooctyl acrylate, 2-ethylhexyl acrylate, isononyl acrylate, isodecyl acrylate, and the like.

Examples of copolymerizable surfactant monomers useful in preparing the emulsion polymer include but are not limited to those which are anionic vinyl functional surfactants, such as sodium vinyl sulfonate, sodium styrene sulfonate, alkylene polyalkoxy sulfates, and the like.

Another polymeric component useful in the microparticle-containing adhesive of the invention is described in copending application Ser. No. 08/093,080. This application discloses a pressure sensitive adhesive polymer comprised of AA, BB and CC monomers. The AA monomer is a hydrophobic monomer selected from the group consisting of an acrylic or a methacrylic ester of a non-tertiary alcohol having from 2 to 14 carbon atoms. The AA monomer comprises from 50 to 80% by weight of AA plus BB plus CC monomers. The BB monomer is selected from β-carboxyethyl acrylate (BCEA) or a salt thereof, and mixtures of BCEA or a salt thereof, and other vinyl carboxylic acids or a salt thereof. The BB monomer comprises from about 10 to about 30% by weight of AA plus BB plus CC monomers. If a mixture of BCEA and the vinyl carboxylic acid or its salt is used, the BCEA must comprise at least 10% by weight of the polymer. Additionally, the carboxylic acid groups of the polymer have been neutralized with an alkali metal hydroxide. The quantity of the hydroxide used to neutralize the acid groups is from about 0.5 to 2 equivalents of the hydroxide per acid group. The CC monomer is a water-dispersible macromolecular monomer which has the formula X-Y-Z. In the C monomer, X is a moiety copolymerizable with AA and BB, Y is a divalent linking group which joins X to Z and Z is a water-dispersible group which contains at least two units which are essentially unreactive under free radical initiated copolymerization conditions which can be used to form the polymer. CC comprises from 10 to 30% by weight of the AA plus BB plus CC monomers.

This pressure sensitive polymer typically has an inherent viscosity (IV) at 27.5° C. in 1-butanone of from 0.2 to over 2 dl/g. Preferably the IV is in the range of 0.7 to 1.5 dl/g. Most preferably the IV is in the range of from 0.9 to 1.4 dl/g.

The AA monomer useful in preparing the terpolymer is a hydrophobic monomeric acrylic or methacrylic ester of a non-tertiary alcohol, which alcohol contains from 2 to 14 carbon atoms and preferably from 4 to 12 carbon atoms. It is preferred that the non-tertiary alcohol be an alkyl alcohol. The term "hydrophobic" is used herein to mean that the AA monomer lacks substantial affinity for water, that is, it neither substantially adsorbs nor absorbs water at room temperature.

Examples of monomers suitable for use as the A monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 1-dodecanol, 1-tridecanol, 1-tetradecanol and the like. The preferred AA monomer is the ester of acrylic acid with butyl alcohol or isooctyl alcohol or a combination thereof, although combinations of two or more different AA monomers are suitable.

Monomer AA is preferably present in an amount of 50 to 80% by weight based on the total monomer content used to prepare the terpolymer. More preferably monomer AA is present in an amount of 60 to 75% by weight.

The BB monomer useful in preparing the terpolymer is polar and is copolymerizable with the AA and CC monomers. It is either BCEA or a salt thereof, or a mixture of BCEA or a salt thereof and vinyl carboxylic acid such as acrylic acid or a salt thereof. Examples of useful vinyl carboxylic acids include acrylic acid, methacrylic acid, iraconic acid, maleic acid and fumaric acid. BCEA is a commercially available material. It is provided as a mixture of ingredients. For example, BCEA is available from Rhone Poulenc, Cranbury, N.J. as a mixture of 20 weight % acrylic acid, 40 weight % BCEA and 40 weight % other acrylic acid oligomers. Preferably, the amount of BB monomer mixture used to prepare the polymer is in the range of 10–20 weight %.

A neutralizing agent is employed in the manufacture of this polymer. It is employed at a level sufficient to neutralize at least 50% of the adhesive copolymer acid moiety. Excess neutralizing agent, i.e., up to 2 equivalents of neutralizing per acid group may be employed. Preferably from 0.75 to 1.5 equivalents of neutralizing agent per acid group are employed. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount selected must not render the adhesive non-dispersible. Preferably sodium and potassium hydroxide are used as neutralizing agents.

The CC monomer useful in preparing the terpolymer is a water-dispersible macromolecular monomer. Preferably the CC monomer contains only one vinyl group copolymerizable with the AA and BB monomers.

Typically, the CC monomer contains a plurality of hydrophilic sites which impart the required hydrophilicity of the monomer.

A preferred X group of the CC monomer is a vinyl group of the general formula II

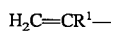

wherein $R^1$ is a hydrogen atom or a methyl group.

A preferred Y group of the CC monomer is a divalent carbonyl group.

A preferred Z moiety of the CC monomer is an oligomeric/polymeric material with a molecular weight of 300 to 30,000, preferably from 350 to 5,000 and more preferably from 400 to 750. Preferably, the Z moiety is a poly(ethoxyloxazoline) or a poly(N-vinylpyrrolidone) or a poly(alkyleneoxide) structure. It is also possible to use a Z compound which is a copolymer of different compounds, e.g. a N-vinylpyrrolidone and acrylamide. If such a copolymer is prepared, one of the monomers, e.g. the acrylamide is present only in minor amounts, that is less than 10% by weight.

Monomer CC is preferably present in an amount of from 10 to 30% by weight, more preferably in the amount of 15 to 25 % by weight of the total monomers.

The ratio of the microparticle component to the water dispersible component employed in the invention may vary over a wide range of compositions. For example, the adhesive composition may comprise from 0.1 to 99.9 parts by weight of the microparticle composition and correspondingly from 99.9 to 0.1 parts by weight of the water-dispersible polymer component. It has been discovered that certain narrower ranges of these two components are preferred for specific utilities. For example, adhesive compositions comprising from about 50 to 95 (preferably from 60 to 95) parts by weight of the microparticle component and, correspondingly, from about 50 to 5 (preferably from 40 to 5) parts by weight of the water-dispersible polymer component can be used to provide tapes that are especially useful in paper splicing applications.

Adhesive compositions that comprise from about 10 to 50 (preferably from 10 to 40) parts by weight of the microparticles and, correspondingly, from about 90 to 50 (preferably from 90 to 40) parts by weight of the water-dispersible component are especially useful in closure systems for surgical wrappers and in mammalian body coverings such as surgical gowns, sheets, drapes and the like. In these applications the tapes can be used without losing their pressure sensitive adhesive properties during the sterilization process. It can also be used with a sterilization indicator to indicate that a wrapped package has passed through a sterilization cycle. However, the wrappers and tapes that utilize the adhesive of the invention can be laundered because the adhesive of the invention disperses in alkaline laundering solutions. Consequently, the adhesives do not need to be removed prior to laundering.

Modifying Agents

The adhesive blend of the invention may optionally contain one, or more, modifying agents to impart or enhance desired characteristics related to the preparation of the adhesive or to its application. Modifying agents are generally employed at a level adequate to achieve the desired result without affecting the pressure sensitive properties of the adhesive. Examples of useful modifying agents include, but are not limited to, thickening agents such as those selected from the group consisting of alkali swellable, associative polymers, such as those sold under the names UCAR® POLYPHOBE® (available from Union Carbide, Inc.); Alcogum™ (available from Alco Chemical); Rheolate™ (available from Rheox); Acrysol™ (available from Rohm & Haas); and Carbopol™ (available from B. F. Goodrich).

Neutralizing agents, which are often employed in combination with thickening agents or carboxylic acid functional polymers, may also be used in the present invention. Such neutralizers include, but are not limited to, those selected from the group consisting of metal ions, such as sodium, potassium, calcium, magnesium, copper, aluminum, or zinc; and amines, such as ammonia, and organic amines such as n-hexylamine, monoethanol amine, hexamethylenediamine.

Other modifying agents which may be used to alter the properties of the adhesive blend include, but are not limited to, those selected from the group consisting of tackifying resins, plasticizers, pigments, fillers, flow control agents, and stabilizers.

Suitable materials useful as the flexible support or backing for the articles of the invention include, but are not limited to, paper, latex saturated paper, polymeric film, cellulose acetate film, ethyl cellulose film, cloth (i.e., woven or nonwoven sheeting formed of synthetic or natural materials), metallic foil, and ceramic sheeting.

Examples of materials that can be included in the flexible support include polyolefins (such as polyethylene, polypropylene (including isotatic polypropylene), polystyrene, polyester, polyvinyl alcohol, poly(ethylene terephthalate), poly(butylene terephthalate), poly(caprolactam), poly(vinylidene fluoride), and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

The flexible support may also comprise a release coated substrate. Such substrates are typically employed when an adhesive transfer tape is provided. Examples of release coated substrates are well known in the art. They include, by way of example, silicone-coated kraft paper and the like.

Tapes of the invention may also incorporate a low adhesion backsize (LAB). Typically this LAB is applied to the tape backing surface that is opposite that bearing the pressure sensitive adhesive. LABS are known in the art.

These and other examples of the invention are illustrated by the following examples which should not be viewed as limiting in scope. Examples of the invention were prepared and examined for launderability, tack, adhesion, shear and repulpability. The following test methods were employed.

TEST METHODS

Tack

In this test, a Delrin wheel (29 g in weight) with diameter of 8.13 cm and rim width of 1.9 cm is rolled down a plane having a length of 26.7 cm and incline at 24° to a horizontal surface on which the tape to be evaluated is positioned, adhesive side up. The distance the wheel rolls along the horizontal adhesive surface is measured, the tack being inversely proportional to the distance the wheel travels.

Repulpability

Repulpability is measured according to TAPPI test UM-213. For a double-faced tape, one 20 cm×2.54 cm strip is sandwiched between two 20 cm×2.54 cm strips of blotter paper. For a single-faced tape, two 20 cm×2.54 cm strips are adhered to blotter paper. The samples are cut into approximately 1.5 cm squares. A sufficient number of 1.5 cm squares of blotter paper are then added to the tape/blotter paper combination to provide a total test sample weight of 15 g. The test sample is then placed in a Waring Blender with 500 ml of room temperature tap water. After the blender has run for 20 seconds, it is stopped for 1 minute while the stock which has splashed up the sides and on the cover of the blender is washed back into the bottom with a water bottle. The blender is then run for an additional 20 seconds, washed down as before, and run for a final 20 seconds. The stock is then removed from the blender and made into a handsheet on a sheet mold. The sheet is removed from the mold, pressed between blotter paper for 90 seconds in a hydraulic press, dried, and examined for any particles of unrepulped tape. If two or fewer particles are present, the tape is considered to have passed the test. The presence of one or two particles does not constitute failure since these can be due to dirty equipment, or screens. When a material fails the test, the particles will be dispersed throughout the sheet.

The foregoing test does not apply to tape products where, the backing is a material, such as polyester film, which does not lend itself to repulping. The dispersibility of the adhesive employed on such a backing may be determined by testing the adhesive film either in the form of an adhesive transfer tape or as a layer on a water-dispersible support layer.

Laundering Test

A test specimen was produced by laminating a section of tape to be tested to an untreated 50% cotton/50% polyester fabric (available from Standard Textile Co., Cincinnati, Ohio as Barrier Supreme™). A 1.8 kg (4 lb) rubber roller was used to laminate the tape to the fabric such that the microparticle-containing adhesive was left exposed. The test specimen was then steam sterilized using a 134° C., 10 minutes, four-pulse prevacuum cycle and a one-minute steam dry time.

The test specimens were then laundered in a 60 lb. commercial washing machine (Milnor washer, Model No. 3602IBWE/AEA; Pillerin Milnor Corp., Kenner, La.). The specimens went through a typical laundry cycle for surgical linens including: (a) a three-minute cold alkaline break in a 0.1% Paralate 55 GL11™ Commercial Liquid Laundry Alkali (Ecolab Inc., St. Paul, Minn.); a three-minute cold water flush, an eight-minute hot break/suds wash using 0.1% of Paralate 55 GLW™ Commercial Liquid Laundry Alkali, and 0.05% Kindet™ Commercial Liquid Laundry Detergent (Egolab Inc.); two three-minute hot water flushes; a three minute cold water flush; a three-minute cold sour/soft rinse using 0.05 % Tri Liquid Sour 55GL™ Commercial Liquid Laundry Sour (Ecolab Inc.), and 0.05% Tex Special Liquid™ Commercial Liquid Denim Lubricant/Softener (Ecolab Inc.), and a six minute extraction to remove excess liquid.

Each laundered specimen was inspected for a pass, meaning that no adhesive residue remained on the fabric, or for a fail, meaning that there was an adhesive residue on the fabric.

Adhesion

This test is for 180° peel adhesion to paper. A 3.175 cm strip of bond paper is laminated to a 5 cm×12.5 cm stainless steel test panel using a double-faced pressure sensitive tape. One end of a 2.54 cm×25 cm strip of sample tape is then laid over the laminated bond paper (if sample is double-faced tape, then 68 g/m$^2$ kraft paper backing is placed on one adhesive side of the sample tape). Uniform adhesive contact is assured by passing a 2 kg roller over the 12.5 cm sample length at a rate of 30.6 min/minute. The tape is then doubled back on itself and peeled from the bond paper surface at 30.5 cm/minute. The force to remove the tape is recorded using an Instron Model 1122 operated at 21° C. and 50% relative humidity.

Shear Strength

A 2.54 cm×2.54 cm end portion of a 2.54 cm×15 cm strip of tape is used. If the tape has adhesive on only one surface, that adhesive face is adhered to a bright annealed steel test panel and rolled down with two passes of a 2 kg roller. If the tape has adhesive on each surface, the adhesive whose shear strength is to be tested is adhered to the bright annealed steel panel and then a section of 68 g/m$^2$ supercalendared kraft paper backing is laminated to the other adhesive face. The panel is then clamped in a jig which is disposed at 2° to the vertical, so that the 12.5 cm free end of the tape extends downward, at an angle of 178° to the test panel, and a 1000 g weight is attached to the tape end. The time for the tape to separate from the panel is reported in to the nearest minute, the shear strength being directly related to the elapsed time. Further details are found in the aforementioned Test Methods for Pressure-Sensitive Tapes, Test PSTC-7. For tapes made with adhesive of this invention, it is desirable to have shear times as high as possible, preferably exceeding 1000 minutes, although an adhesive may be satisfactory if its shear time is as low as 40 minutes.

Abbreviations

The following abbreviations are used in the examples disclosed herein.
AA=acrylic acid
BA=butyl acrylate
BCEA=beta-carboxyethyl acrylate
PEOA=poly(ethylene oxide) monoacrylate, average molecular weight of 750
EOEA=2-ethoxy ethyl acrylate
EOEOEA=2-(2-ethoxy)ethoxy ethyl acrylate
HDDA=1,6-hexanediol diacrylate
IOA=isooctyl acrylate
MSA=microparticle adhesive
PC=water-dispersible polymeric component
PPG=poly(propylene glycol)
PAA=poly(acrylic acid)
PVA=poly(vinyl alcohol)
Repulp=Repulpability test
P=pass (Repulpability test)
F=fail (Repulpability test)
The parenthetical expression that introduces each preparation identifies the monomeric components and the weight percentages of each used in the preparations.

Microparticle Preparation

Microparticle Component A
(IOA:AA;PEOA/97:2:1)

4.8 g of AA, 2.4 g of PEOA and 1.13 g Lucidol™-70 (70% benzoyl peroxide; available from Elf Atochem) were dissolved in 232 g IOA. 0.75 g Siponate™ DS-10 (sodium dodecyl benzene sulfonate surfactant; available from Rhone-Poulenc) was dissolved in 360 g of water. The IOA mixture was then added to the surfactant solution and emulsified using an Omni™ Mixer until the droplet size was less than 5 microns. The 40% solids emulsion was then charged to the 1 liter baffled reactor, heated to 65° C., degassed with N$_2$ allowed to react for 8 hours.

Microparticle Component B
(IOA:AA:PEOA/89:1:10)

2.1 g of AA, 21 g of PEOA, 0.21 g of poly(ethylene oxide)$_9$ dimethacrylate, and 0.99 g of Lucidol™ 70 were dissolved in 186.9 g of IOA. 6 g of Standapol™. A surfactant (ammonium lauryl sulfate, Hercules) was dissolved in 390 g of water. The IOA mixture was added to the surfactant solution, then emulsified using an Omni™ Mixer until the droplet size was less than 5 micrometers. The emulsion was then charged to a 1 liter indented resin flask, heated to 60° C., degassed with argon, and allowed to react for 18 hours.

Microparticle Component C
(IOA:BA:AA:PEOA/79:17:1:3)

2.1 g of AA 8.4 g of PEOA, 39.9 g of BA, 0.25 g of HDDA, and 0.99 g of Lucidol™-70 were dissolved in 186.9 g of IOA. 6.5 g of Standapol™. A surfactant (ammonium lauryl sulfate, Hercules) was dissolved in 390 g of water. The IOA mixture was added to the surfactant solution, then emulsified busing an Omni™ Mixer until the droplet size was less than 5 micrometers. The emulsion was then charged to a 1 liter indented resin flask, heated to 65° C., degassed with argon, and allowed to react for 22 hours.

Microparticle Component D
(IOA:AA:HDDA/96:2:2)

4.2 g of AA, 4.2 g of HDDA, and 1.13 g of Lucidol™-70 were dissolved in 230 g of IOA. 0.75 g of sodium dodecyl benzene sulfonate surfactant was dissolved in 360 g of water. The IOA mixture was added to the surfactant solution, then emulsified using an Omni™ Mixer until the droplet size was less than 5 micrometers. The emulsion was then charged to a 1 liter indented resin flask, heated to 65 ° C., degassed with argon, and allowed to react for 12 hours. The resulting microparticles were non-tacky.

Microparticle Component E (100% IOA)

The microparticles were prepared in a 1 liter indented resin flask that was charged with 450 ml of deionized water and 4 g of Standapol™. The aqueous solution was stirred at 400 rpm, heated to 70° C., and degassed with argon. 150 g of IOA and 0.71 g of Lucidol™-70 were added to the hot aqueous surfactant solution. The temperature was then reduced to 65° C., and the mixture allowed to react for 22 hours. The approximate average particle diameter was 33 microns as determined by optical microscopy.

Water-Dispersible Polymeric Component Preparation

PC-1 (EOEOEA:AA/80:20)

1217 g deionized water and 0.39 g potassium persulfate were added to a three liter flask equipped with condenser, agitator, and nitrogen purge line. The mixture was heated to 76° C., purged with N$_2$ and, agitated at 150 rpm. Charges I, II, and III were prepared. Charge I contained 13.5 g Mazon™ SAM-211, commercially available from PPG/Mazer Chemicals, dissolved in 100 g deionized water. Charge II contained 0.39 g potassium persulfate dissolved in 50 g deionized water. Charge III contained 240 g EOEOEA, 60 g AA, and 0.09 g t-dodecyl mercaptan. Charge I and 75.0 g of Charge III were added to the flask and reacted for 30 minutes. The remaining portion of Charge III and all of Charge II were then added incrementally to the flask over a 1–2.5 hour period. The contents of the flask were then reacted for an additional 35 minutes after the last charge of ingredients. The emulsified contents were cooled and drained from the flask. They had a pH=3.32, a Brookfield viscosity=5 cps, and particle size=182µ.

PC-2 (EOEA:AA/85:15)

800 g deionized water and 0.39 g potassium persulfate were added to a two liter flask equipped with condenser, agitator, and nitrogen purge line. The contents were heated to 76° C., purged with N$_2$ and agitated at 300 rpm. Charges I, II, and III were prepared. Charge I contained 13.5 g Mazon™ SAM-211 dissolved in 100 g deionized water. Charge II contained 0.39 g potassium persulfate dissolved in 50 g deionized water. Charge III contained 255 g EOEOEA, 45 g and 0.09 g t-dodecyl mercaptan. Charge I and 75.0 g of Charge III were added to the flask and reacted for 30 minutes. The remaining part of Charge III and all of Charge II were then added incrementally over a –2.5 hour period. After the last addition the contents of the flask were reacted for an additional 35 minutes. The emulsified contents were cooled and drained from the flask. The polymer had a particle size=94.3µ.

PC-3 (EOEOEA:BA:AA/75:15:10)

800 g deionized water and 0.39 g potassium persulfate were added to a two liter flask equipped with condenser, agitator, and nitrogen purge line and heated to 76° C., purged with N$_2$ and agitated at 300 rpm. Charges I, II, and III were prepared. Charge I contained 13.5 g Mazon™ SAM-211 dissolved in 100 g deionized water. Charge II contained 0.39 g potassium persulfate dissolved in 50 g deionized water. Charge III contained 225 g EOEOEA, 45 g BA, 30 g AA, and 0.09 g t-dodecyl mercaptan. Charge I and 75.0 g of Charge III were added to the flask and reacted for 30 minutes. The remaining portion of Charge III and all of Charge II were added incrementally over a 1–2.5 hour period. The ingredients were reacted for an additional 35 minutes after the last charge. The emulsified contents were cooled and drained from the flask. The polymer had a particle size=236µ.

PC-4 (EOEOEA:BA:AA/70:15:15)

1672 g deionized water, 20.9 g Mazon™ SAM-211, and 2.1 g potassium persulfate were added to a three liter flask equipped with condenser, agitator, and nitrogen purge line, heated to 76° C., purged with N$_2$ and agitated at 200 rpm. A premix containing 292.6 g EOEOEA, 62.7 g BA, 62.7 g AA, and 0.30 g t-dodecyl mercaptan were prepared and add to the flask through a dropping funnel over 5 hour period. The emulsified product was then cooled and drained from the flask. The polymer had a pH=2.46, a Brookfield viscosity= 4.5 cps and a particle size=108µ.

PC-5 (EOEOEA:BA:AA/50:35:15)

1672 g deionized water, 20.9 g Mazon™ SAM-211, and 2.1 g potassium persulfate were added to a three liter flask equipped with condenser, agitator, and nitrogen purge line, heated to 76° C., purged with N$_2$ and, agitated at 200 rpm for a premix containing 209 g EOEOEA, 146.3 g BA, 62.7 g AA, and 0.21 g t-dodecyl mercaptan was prepared and added to the flask through a dropping funnel over 6 hour period. The emulsified reaction product was then cooled and drained from the flask. It had a pH=2.55, a Brookfield viscosity =4.5 cps, and a particle size=91.0µ.

PC-6 (EOEOEA:BCEA/82:18)

2000 g deionized water and 0.65 g potassium persulfate were added to a three liter flask equipped with condenser, agitator, and nitrogen purge line, heated to 76° C., purged with $N_2$ and, agitated at 150 rpm. Charges I, II, and III were prepared. Charge I contained 22.5 g Mazon™ SAM-211 dissolved in 100 g deionized water. Charge II contained 0.65 g potassium persulfate dissolved in 50 g deionized water. Charge III contained 410 g EOEOEA, 90 g BCEA, and 0.15 g t-dodecyl mercaptan. Charge I and 75.0 g of Charge III were added to the flask and reacted for 30 minutes. The remaining portion of Charge III and all of Charge II were then added over a 1–5 hour period. The contents of the flask were reacted for an additional 35 minutes after the last charge. The emulsified reaction product was cooled and drained from the flask. It had a pH=4.47, a Brookfield viscosity=1.5 cps, and a particle size=146μ.

PC-7 (EOEOEA:BA:AA/60:20:20)

1217 g deionized water and 0.39 g potassium persulfate were added to a three liter flask equipped with condenser, agitator, and nitrogen purge line, and heated to 76° C., purged with $N_2$ and, agitated at 150 rpm. Charges I, II, and III were prepared. Charge I contained 13.5 g Mazon™ SAM-211 dissolved in 100 g deionized water. Charge II contained 0.39 g potassium persulfate in 50 g dissolved in deionized water. Charge III contained 180 g EOEOEA, 60 g BA, 60 g AA, and 0.09 g t-dodecyl mercaptan. Charge I and 75.0 g of Charge III were added to the flask and reacted for 30 minutes. The remaining Charge III and all of Charge II were then added over a 1–2.5 hour period. The contents of the flask were then reacted for an additional 30 minutes after which they were cooled and drained. The emulsified reaction product had a particle size=101μ, and Brookfield viscosity= 5.0 cps.

PC-8 (EOEOEA:IOA:BCEA/50:17:33)

1220 g deionized water and 0.39 g potassium persulfate were added to a three liter flask equipped with condenser, agitator, and nitrogen purge line, heated to 76° C., purged with $N_2$ and, agitated at 150 rpm. Charges I, II, and III were prepared. Charge I contained 13.5 g Mazon™ SAM-211 dissolved in 100 g deionized water. Charge II contained 0.39 g potassium persulfate dissolved in 50 g deionized water. Charge III contained 150 g EOEOEA, 1.0 g IOA, 99.0 g BECA, and 0.09 g t-dodecyl mercaptan. Charge I and 5.0 g of Charge III were added to the flask and reacted for 30 minutes. The remaining Charge III and all of Charge II were then added over a 1–3 hour period. The contents of the flask were reacted for additional 35 minutes. The emulsified reaction product was cooled and drained from the flask. It had a pH =3.32, a Brookfield viscosity=3 cps, and a particle size=210μ.

PC-9 (EOEOEA:AA/95:5)

800 g deionized water and 0.39 g of potassium persulfate were added to a two liter split resin flask equipped with condenser, agitator, and nitrogen purge line, and heated to 76° C. and, agitated at 150 rpm. The flask was purged with 1 liter per minute $N_2$. Charges I, II, and III were prepared. Charge I contained 15.0 g Mazon™ SAM-211, dissolved in 100 g deionized water. Charge II contained 0.39 g potassium persulfate dissolved in 50 g deionized water. Charge III contained 285 g EOEOEA, available from Sartomer Chemical Co., 15 g AA, and 0.09 g t-dodecyl mercaptan. Charge I and 75.0 g of Charge III were added to the flask and reacted for 30 minutes. The remaining Charge III and all of Charge II were then added over a 1–2.5 hour period. The contents of the flask were reacted for an additional 30 minutes after which the emulsified reaction product was cooled and drained from the flask.

PC-10 (IOA:AA/85:15)

800 g deionized water and 0.39 g potassium persulfate were added to a two liter split resin flask equipped with condenser, agitator, and nitrogen purge line. The reactants were heated to 76° C., purged with $N_2$ (1 l/min) and, agitated at 150 rpm. Charges I, and II, were prepared. Charge I contained 13.5 g Mazon™ SAM-211 dissolved in 100 g deionized water. Charge II contained 225 g IOA, 45 g AA, and 0.09 g t-dodecyl mercaptan. Charge I and 75 g of Charge II were added to the flask and reacted for 30 minutes at 76° C. The remaining portion of Charge II was then added over a 2 hour period. The contents of the flask were then reacted for an additional 30 minutes. The resulting emulsified reaction product was then cooled and drained from the flask. It had a solids content of 26.8% by weight and a particle size of 128 nanometers.

PC-11 (EOEOEA:AA/90:10)

2403 g deionized water and 1.17 g potassium persulfate were added to a five liter flask equipped with condenser, agitator, and nitrogen purge line. The reactants were heated to 76° C., purged with $N_2$ and, agitated at 150 rpm. Charges I, II, and III were prepared. Charge I contained 40.5 g Mazon™ SAM-211 dissolved in 297.0 g deionized water. Charge II contained 1.17 g potassium persulfate dissolved in 100 g deionized water. Charge III contained 810 g EOEOEA, 90 g AA, and 0.27 g t-dodecyl mercaptan. Charge I and 300 g of Charge III were added to the flask and reacted for 30 minutes. The remaining Charge III and all of Charge II were then added over a 1–2.5 hour period. The contents of the flask were then reacted for an additional 30 minutes. The resulting emulsified reaction product was then cooled and drained from the flask.

PC-12 (EOEOEA:AA/90:10)

62.3 kg deionized water and 21.2 g potassium persulfate to a 25 gallon (95 l) glass-lined reactor and heated to 76° C. The contents of the reactor were agitated at 75 rpm and purged with $N_2$. Charges I and II were then prepared. Charge I contained 1.6 kg AA, 735 g Mazon™ SAM-211, 14.7 kg EOEOEA, and 4.9 g t-dodecyl mercaptan. Charge II contained 5.3 kg deionized water and 21.2 g potassium persulfate. 4.3 kg of Charge I were added to the reactor and reacted for 30 minutes. The remaining Charge I and all of Charge II were then added to the reactor over a 1.5–2 hour period. The contents of the reactor were reacted for an additional one hour. The resulting emulsified reaction product was cooled and drained from the reactor. It had a particle size=228μ, and a Brookfield viscosity=4 cps.

EXAMPLES 1–10

Adhesive tape samples employing only Microparticle Components A–E were prepared by mixing the microparticles with 1% by weight of an associative, alkali-swellable thickener, (UCAR Polyphobe™ 104, available from Union Carbide) and neutralized with potassium hydroxide and poly(oxypropylene)triamine to a pH of 7. The adhesive was coated on a release surface and dried in a oven at 79° C. for three minutes This was laminated to "Crystex" tissue paper to provide a single sided construction. To obtain a double sided construction, adhesive was coated onto the opposite side of the single sided sample and dried in a similar manner. Testing was conducted after removal of the release liner.

Adhesive tape samples tier Examples 1–10 were prepared by mixing the Microparticle Component A with the desired water soluble, or dispersible, polymeric component, then thickened, neutralized, and coated in the same manner as used with the tapes made from Microparticle Components A–E above. The water soluble, or dispersible, polymeric components employed were an organic phosphate ester, Gafac® PE-510, available from International Specialty Products; poly(vinyl alcohol), PVA, with a molecular weight of $8\times10^5$ g/mol; poly(acrylic acid), PAA, with a molecular weight of $2\times10^5$ g/mol; poly(ethylene oxide), PEO, with a molecular weight of $10^6$ g/mol; ethoxylated alkylphenols, Igepal® CA-520, CA-630 and CO-630, available from International Specialty Products; poly(alkylene glycol), Sannix® SP-750, available from Sanyo Chemical Industries; and poly(propylene glycol), PPG, with a molecular weight of 400 g/mol.

These examples show that addition of a water soluble, or dispersible, polymeric component to a microparticle adhesive provides enhanced performance in tack while maintaining repulpability. These results are recorded in Table 1.

TABLE 1

| Example | Polymeric Component | % P.C. | Tack (mm) | Repulp Test (P/F) |
|---|---|---|---|---|
| Control | None (All Microparticle Component A) | 0 | 80 | P |
| 1 | Gafac ® PE-510 | 0.5 | 15 | P |
| 2 | Gafac ® PE-510 | 1.0 | 20 | P |
| 3 | PVA | 1.0 | 33 | P |
| 4 | PAA | 1.0 | 38 | P |
| 5 | PEO | 1.0 | 29 | P |
| 6 | Igepal ® CA-520 | 2.5 | 48 | P |
| 7 | Igepal ® CA-630 | 2.5 | 47 | P |
| 8 | Igepal ® CO-630 | 2.5 | 36 | P |
| 9 | Sannix ® SP-750 | 5.0 | 30 | P |
| 10 | PPG | 5.0 | 33 | P |

EXAMPLES 11–21

Examples 11–21 were prepared in the same manner as Examples 1–10 using Microparticle Component A and the Polymeric Component indicated in Table 2. However, no thickening agent was added.

These examples show that when the water soluble, or dispersible, polymeric component added is a PSA, the adhesion performance is improved in all cases, as is the tack in most cases, while maintaining repulpability. The results are recorded in Table 2.

TABLE 2

| Example | Polymeric Component (PC) | PC Component (%) | Tack (mm) | Repulp Test (P/F) | Adhesion (N/cm) |
|---|---|---|---|---|---|
| Control | None (All Microparticle Component A) | 0 | 80 | P | 3.6 |
| 11 | PC-1 | 22 | 56 | P | 6.9 |
| 12 | PC-2 | 22 | 17 | P | 8.0 |

TABLE 2-continued

| Example | Polymeric Component (PC) | PC Component (%) | Tack (mm) | Repulp Test (P/F) | Adhesion (N/cm) |
|---|---|---|---|---|---|
| 13 | PC-3 | 22 | 20 | P | 7.3 |
| 14 | PC-4 | 22 | 123 | P | 7.1 |
| 15 | PC-5 | 22 | 79 | P | 6.9 |
| 16 | PC-6 | 22 | 14 | P | 8.4 |
| 17 | PC-7 | 13 | 38 | P | 6.3 |
| 18 | PC-8 | 13 | 20 | P | 7.1 |
| 19 | PC-1 | 13 | 33 | P | 6.4 |
| 20 | PC-9 | 13 | 21 | P | 5.8 |
| 21 | PC-10 | 22 | 32 | P | 6.0 |

EXAMPLES 22–23

In Examples 22–33 the water soluble, or dispersible, polymeric component used was PC-11 and the Microparticle Component was Microparticle Component A. Example 22 was prepared in the same manner as Example 1; and Examples 23–32 were prepared in the same manner as Example 11. Example 33 was neutralized as described in Example 11.

These examples demonstrate the properties of the invention over a wide range of polymeric component concentrations. The results show enhanced performance in tack and adhesion and in shear (in most cases), while repulpability is maintained, with respect to Control A as recorded in Table 3.

TABLE 3

| Example | Polymeric Component (%) | Tack (mm) | Repulp Test (P/F) | Adhesion (N/cm) | RT Shear Adhesion (min) |
|---|---|---|---|---|---|
| Control A | 0 (All Microparticle Component A) | 80 | P | 3.6 | 1330 |
| 22 | 5 | 62 | P | 5.4 | 2800+ |
| 23 | 9 | 37 | P | 5.4 | 2800+ |
| 24 | 13 | 24 | P | 5.4 | 2800+ |
| 25 | 23 | 21 | P | 6.1 | 2800+ |
| 26 | 31 | 18 | P | 6.1 | 2800+ |
| 27 | 38 | 18 | P | 5.7 | 2800+ |
| 28 | 43 | 22 | P | 6.1 | 2020 (Shear) |
| 29 | 47 | 22 | P | 6.5 | 1650 (Shear) |
| 30 | 60 | 35 | P | 5.7 | 130 (Shear) |
| 31 | 75 | 33 | P | 5.9 | 76 (Shear) |
| 32 | 90 | 39 | P | 5.9 | 57 (Shear) |
| 33 | 100 (All PC-11) | 31 | P | 7.8 | 130 (Shear) |

Control A popped off after 1330 minutes. Examples 28, 29 and 33 sheared at the indicated time.

EXAMPLES 34–38

These Examples show the effect of combining a water-dispersible, polymeric component, consisting of a copolymer of EOEOEA and acrylic acid at various ratios, with different types of microparticle adhesives. Examples 34, 35, 36, 37, and 38 (with a polymeric component) were prepared in the same manner as Example 11.

Control B and Example 34 compare microparticle compositions which contain 10% PEOA. Control B employs no polymeric component. Example 34 employs 22 % by weight of PC-5. Incorporation of PC-5 results in improved adhesion and repulpability as shown in Table 4.

TABLE 4

| Example | Microparticle Component | PC Component | Tack (mm) | Repulp Test (P/F) | Adhesion (N/cm) |
|---|---|---|---|---|---|
| Control B | B | — | 19 | F | 5.8 |
| 34 | B | PC-5 | 35 | P | 6.7 |

Control C and Example 35 compare microparticle compositions which contain PEOA and butyl acrylate. Control C employs no polymeric component. Example 35 contains 22% by weight PC-1. Incorporation of PC-1 results in improved adhesion and repulpability as shown in Table 5.

TABLE 5

| Example | Microparticle Component | PC Component | Tack (mm) | Repulp Test (P/F) | Adhesion (N/cm) |
|---|---|---|---|---|---|
| Control C | C | — | 33 | F | 3.7 |
| 35 | C | PC-1 | 180 | P | 5.6 |

Control D and Examples 36 and 37 compare microparticle compositions which are tack free. Control D employs no polymeric component. Examples and 37 employ 33 and 43 weight percent PC-4, respectively. Incorporation of PC-4 results in improved tack and adhesion, while maintaining repulpability as shown in Table 6.

TABLE 6

| Example | Microparticle Component | PC Component | Tack (mm) | Repulp Test (P/F) | Adhesion (N/cm) |
|---|---|---|---|---|---|
| Control D | D | — | *** | P | *** |
| 36 | D | PC-4 | 150 | P | 1.3 |
| 37 | D | PC-4 | 150 | P | 2.9 |

***tack free, unable to test

Control E and Example 38 compare microparticle compositions which are large in size, diameter=33 micrometers, relative to all other Examples disclosed herein in which the diameter is approximately 3 micrometers. Control E employs no polymeric component. Example 38 employed 43 percent by weight of PC-12. Incorporation of PC-12 results in improvement in tack and repulpability.

TABLE 7

| Example | Microparticle Component | PC Component | Tack (mm) | Repulp Test (P/F) | Adhesion (N/cm) |
|---|---|---|---|---|---|
| Control E | E | — | 170 | F | 6.1 |
| 38 | E | PC-12 | 130 | P | 4.1 |

EXAMPLES 39–42

Pressure sensitive adhesive tapes of the invention were prepared, laminated to untreated 50% cotton/50% polyester fabric (Barrier Supreme™) and laundered as described in the Laundering Test. The backing employed in the tape was "Crystex" tissue paper. The adhesive compositions tested and the results obtained are set out in Table 8.

TABLE 8

| Example | Microparticle Component Mat'l. | Microparticle Component Parts by Weight | Water-Dispersible Component Mat'l. | Water-Dispersible Component Parts by Weight |
|---|---|---|---|---|
| 39 | A | 78 | PC-6 | 22 |
| 40 | A | 87 | PC-7 | 13 |
| 41 | A | 87 | PC-1 | 13 |
| 42 | A | 87 | PC-8 | 13 |

All samples showed no evidence of residue on the laundered fabric.

EXAMPLE 43

A water-dispersible polymer was prepared. First, a monomethoxypolyethyl(eneglycol) acrylate monomer with a molecular weight of 750 was prepared by Fischer esterification of Carbowax™ 750 (Union Carbide). One hundred parts of the Carbowax™750 and 100 parts of toluene were introduced to a flask which was equipped with a Dean-Stark condenser and a stirrer. The solution was heated to reflux-temperature for two hours. 11.3 pans of acrylic acid, 4.5 pans of p-toluene sulfonic acid, 3,000 ppm of Irganox™ PS 800 (Ciba-Geigy) and 500 ppm phenothiazine were added into this mixture. The solution was heated to reflux-temperature for another 16 hours. After cooling down to room temperature, excess acid was neutralized with 4.5 pans of calcium hydroxide. The formed precipitate was filtered off. Subsequently the toluene was evaporated under reduced pressure to yield a solid 100% acrylate monomer.

A water-dispersible pressure sensitive adhesive polymers was prepared by charging butyl acrylate (BA), BCEA (commercially available as a mixture of 20 weight % acrylic acid, 40 weight % BCEA, 40 weight % other acrylic acid oligomers from Rhone Poulenc), the mono-methoxypoly(ethyleneglycol) acrylate monomer to a one quart bottle containing a solvent mixture of ethyl acetate, methanol and isopropanol, and 0.51 grams azobisisobutyronitrile. The monomer charge comprised between 32 and 34% of the polymerization mixture. The mixture was deoxygenated by purging with one liter per minute nitrogen for two minutes. The bottle was sealed and placed in a rotating water bath at 55° C. for 24 hours to effect essentially complete polymerization. The inherent viscosity (IV) of the resultant polymer was then measured in 2-butanone at 27.5° C. Neutralizing agent (86.8% pure KOH, 1.25 neutralization equivalents based upon 100% pure KOH) in a 3.57N 50:50 methanol:water (V/V) solution was blended into the adhesive polymer. Microparticles (A) were then mixed into the adhesive polymer to give a final ratio of 20 g microparticles to 100 g adhesive polymer (i.e., 16.7% microparticles by weight).

The resultant neutralized microparticle-containing pressure sensitive adhesive composition was applied to a 29 pound basis weight Kraft paper (M-2383) Smooth Crepe Semi-Bleached Kraft Saturating Paper from Mosinee Paper Corporation of Mosinee, Wis.) to form a closure tape as described below.

The pressure sensitive adhesives in the solvent system were coated on the Kraft paper at 0.68 grams per 154.8 cm$^2$ (24 in$^2$) using a standard laboratory knife coater, with drying for 15 minutes in a forced air oven at 100° C.

Table 9 shows the initial adhesion, post-sterilization adhesion, pre-sterilization wrapper closure (T(O)), post-sterilization wrapper closure (T(A)), and dispersibility of the closure tapes of Example 43 and Comparative Example 1 on a fluorochemically-treated polyester wrapper. The following test procedures were utilized.

Initial Adhesion to Treated Drape Wrappers

Samples of a fluorochemically-treated polyester drape (available from Standard Textile Co., Cincinnati, Ohio as WrapPel™ T) were cut into 3.81 cm by 10.16 cm strips and adhered with #410 double coated tape available from the 3M Co.) to a 5.08 cm by 12.2 cm steel plate. Example closure tapes of the invention (2.54 cm by 10.16 cm) were applied to the drape and were rolled twice with a 2 kg rubber roller.

One end of each of the plate was placed in the jaws on an Instron Model 1122 tensile tester (Instron Corp., Canton, Mass.), while one end of the closure tape was adhered to the opposing set of jaws of the tensile tester to allow removal of the tape from the drape at essentially a 180° peel angle. The rate of jaw movement was 30.48 cm/minute and the tensile tester recorded the force required to separate the tape laminate from the drape. The results were recorded in Newtons per 2.54 cm (N/2.54 cm). The initial adhesion measurement derives from the tact that the dwell time of the tape on the drape was short; i.e., the example tape was applied and peeled without a long residence time (i.e., less than 5 minutes) in between, and sterilization had not yet taken place.

Post-sterilization Adhesion to Treated Drape

The same method as the initial adhesion test was used for this test, except that prior to testing, the example closure tapes were steam sterilized at a setting of 273° F. (134° C.), in a 10 minute gravity cycle with a three minute steam dry time. The sterilizer used was a Barnstead Model GLS-10D (MDT Biologic Co., Rancho Dominquez, Calif.). In addition, the laminate was allowed to cool at room temperature for a minimum of 4 hours before peel testing. The results were recorded in N/2.54 cm.

Static Shear Strength

The tapes were tested for static shear strength as follows. A stainless steel plate was washed with diacetone and wiped with a tissue (KIM-WIPE) and then washed again with heptane followed by wiping with a tissue. The heptane wash was repeated two more times. A length of the tape was applied to the WraPel™ T drape material to provide a 2.54 cm by 2.54 cm bond area. The remainder of the tape hung over the edge and was doubled back to form a loop. A 2 kg roller was passed back and forth over the bond area once in the length direction of the tape. A 250 g weight was hung from the loop and the resulting assembly hung vertically in a room maintained at 20° C. and 50% relative humidity. The time to failure (i.e., the time for the tape to fall from the stainless steel plate) was measured.

TABLE 9

| Property | |
|---|---|
| Initial Adhesion | 229 N/2.54 cm |
| Post Sterilization Adhesion (N/2.54 cm) | 88 N/2.54 cm |
| Static Shear | 88 min |
| Dispersibility | Pass |

While this invention has been described in terms of specific embodiments it should be understood that it is capable of further modification. The claims herein are intended to cover those variations one skilled in the art would recognize as the chemical equivalent of what has been described here.

What is claimed is:

1. A water dispersible, normally tacky pressure sensitive adhesive composition comprising a blend of:
   A) a polymeric, elastomeric, solvent insoluble but solvent dispersible microparticle component, and
   B) a water-dispersible polymeric component, wherein said adhesive composition is repulpable when tested according to TAPPI test UM-213.

2. A pressure sensitive adhesive composition according to claim 1 comprising from about 0.1 to 99.9 parts by weight of said microparticle component, and correspondingly from 99.9 to 0.1 parts by weight of said water-dispersible component.

3. A pressure sensitive adhesive composition according to claim 1 wherein the microparticle portion of said microparticle component is either a solid particle or a particle containing at least one void.

4. A normally tacky pressure-sensitive adhesive composition comprising a blend of:
   A) a polymeric, elastomeric solvent insoluble but solvent dispersible microparticle component, that comprises the polymer of:
      (1) 100 parts by weight or less of at least one free radically polymerizable monomer selected from the group consisting of alkyl acrylate esters, alkyl methacrylate esters and mixtures thereof;
      (2) 0 to 30 parts by weight of at least one polar monomer copolymerizable with the free radically polymerizable monomer of part A(1); and
      (3) 0 to 40 parts by weight of at least one hydrophilic oligomer or polymer copolymerizable with either of the free radically polymerizable monomer A(1) and the polar monomer A(2), and
   B) a water-dispersible polymer component that comprises the polymer of:
      (1) 50 to 98 parts by weight of a water soluble poly-(alkoxyalkyl)acrylate; and correspondingly
      (2) 50 to 2 parts by weight of a carboxylic acid
   wherein the microparticle is either solid or contains at least one void.

5. A pressure sensitive adhesive composition according to claim 4 wherein the microparticle component comprises from about 80 to 98 parts of the free radically polymerizable monomer, from about 1 to 17 parts by weight of the polar monomer and from about 1 to 18 parts by weight of the hydrophilic oligomer or polymer.

6. A pressure sensitive adhesive composition according to claim 5 wherein said hydrophilic component comprises macromonomers of the general formula

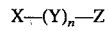

wherein
   X is a group that is free radically copolymerizable with the free radically polymerizable monomer and optional polar monomer(s);
   Y is a divalent linking group;
   n is an integer of 0 to 1; and
   Z is a monovalent hydrophilic polymeric or oligomeric moiety having a degree of polymerization greater than or equal to 2.

7. A pressure sensitive adhesive composition according to claim 5 wherein the water-dispersible polymer component further comprises from about 0 to 40 parts by weight of an essentially water-insoluble alkyl acrylate and from 0 to 6 pans by weight of an emulsifier monomer.

8. A pressure sensitive adhesive composition according to claim 7 wherein the water-dispersible polymer component comprises from about 80 to 95 parts by weight of said poly(alkoxyalkyl) acrylate, from about 20 to 5 parts by weight of said carboxylic acid, and from about 0 to 4 parts by weight of said emulsifier monomer.

9. A pressure sensitive adhesive sheet comprising a layer of the water dispersible normally tacky pressure sensitive adhesive of claim 1.

10. A water-dispersible pressure sensitive adhesive comprising a polymer that is the emulsion polymerization product of:

A) from about 50 to 98 parts by weight of a poly(alkoxyalkyl)acrylate; and correspondingly B) from about 50 to 2 parts by weight of carboxylic acid; and C) from about 0 to 40 parts by weight of an essentially water-insoluble alkyl acrylate: and D) from about 0 to 6 parts by weight of an emulsion monomer copolymerizable with either of said poly(alkoxyalkyl)acrylate or said carboxylic acid, wherein the polymer is pressure sensitive.

11. A water-dispersible pressure sensitive adhesive according to claim 10 wherein; the polymer comprises the polymerization product of:

A) from about 80 to 95 parts by weight of said poly(alkoxyalkyl)acrylate; correspondingly B) from about 20 to 5 parts by weight of said carboxylic acid; and D) from about 0 to 4 parts by weight of said emulsifier monomer.

12. A pressure sensitive adhesive sheet comprising a layer of a normally tacky pressure sensitive adhesive according to claim 10.

13. A pressure sensitive adhesive composition according to claim 4 comprising from 10 to 95 parts by weight of said microparticle component and from 90 to 5 parts by weight of said polymeric component.

14. A pressure sensitive adhesive composition according to claim 13 comprising from 50 to 95 parts by weight of said microparticle component and from 50 to 5 parts by weight of said polymeric component.

15. A pressure sensitive adhesive composition according to claim 14 comprising from 60 to 95 parts by weight of said microparticle component and from 40 to 5 pans by weight of said polymeric component.

16. A launderable pressure sensitive adhesive composition according to claim 2 comprising from 10 to 50 parts by weight of said microparticle component and from 90 to 50 parts by weight of said polymeric component.

17. A launderable pressure sensitive adhesive composition according to claim 16 comprising from 10 to 40 parts by weight of said microparticle component and from 90 to 60 parts by weight of said polymeric component.

18. A pressure sensitive adhesive composition according to claim 4 wherein said microparticle component is pressure sensitive.

19. A pressure sensitive adhesive composition according to claim 4 wherein said water-dispersible polymeric component is pressure sensitive.

20. A pressure sensitive adhesive composition according to claim 4 in the form of an unsupported sheet.

21. A pressure sensitive adhesive composition according to claim 1 wherein

A) said polymeric, elastomeric solvent insoluble but solvent dispersible microparticle component comprises the polymer of:
(1) 100 parts by weight or less of at least one free radically polymerizable monomer selected from the group consisting of alkyl acrylate esters, alkyl methacrylate esters and mixtures thereof;
(2) 0 to 30 parts by weight of at least one polar monomer copolymerizable with the free radically polymerizable monomer of part A(1); and
(3) 0 to 40 pans by weight of at least one hydrophilic oligomer or polymer copolymerizable with either of the free radically polymerizable monomer A(1) and the polar monomer A(2), and B) said water-dispersible polymer component comprises the polymer of:
(1) 50 to 98 pans by weight of a water soluble poly(alkoxyalkyl)acrylate; and correspondingly
(2) 50 to 2 parts by weight of a carboxylic acid wherein the microparticle is either solid or contains at least one void.

22. A pressure sensitive adhesive composition according to claim 21 comprising from 50 to 95 parts by weight of said microparticle component and correspondingly from 50 to 5 parts by weight of said water-dispersible polymeric component.

23. A pressure sensitive adhesive composition according to claim 22 comprising from 60 to 95 parts by weight of said microparticle component and correspondingly from 40 to 5 parts by weight of said water-dispersible polymeric component.

24. A pressure sensitive adhesive composition according to claim 21 comprising from 10 to 50 parts by weight of said microparticle component and correspondingly from 90 to 50 parts by weight of said water-dispersible polymeric component.

25. A pressure sensitive adhesive composition according to claim 24 comprising from 10 to 40 parts by weight of said microparticle component and correspondingly from 90 to 60 parts by weight of said water-dispersible polymeric component.

26. A repulpable, pressure sensitive adhesive composition according to claim 1.

27. A pressure sensitive adhesive composition according to claim 21 wherein said microparticle component is tack free.

28. A pressure sensitive adhesive composition according to claim 21 wherein said water-dispersible polymeric component is pressure sensitive.

29. A pressure sensitive adhesive composition according to claim 21 wherein said microparticle component is pressure sensitive.

30. A pressure sensitive adhesive composition according to claim 4 comprising from 0.1 to 99.9 parts by weight of said microparticle component and from 99.9 to 0.1 parts by weight of said water-dispersible polymeric component.

* * * * *

UNITED STATES PATENT AND TRADEMARK OFFICE
CERTIFICATE OF CORRECTION

Page 1 of 2

PATENT NO.: 5,512,612

DATED: April 30, 1996

INVENTOR(S): Mary L. BROWN, Richard J. GOETZ, Cheryl L. MOORE, Donald R. BATTLES It is certified that error appears in the above-identified patent and that said Letters Patent is hereby corrected as shown below:

Column 3, Line 21, "tree" should be --free--;

Column 5, Line 33, "toohomers" should be --monomers--;

Column 5, Line 42, "iraconic" should be --itaconic--;

Column 6, Line 7, '"tree" should be --free--;

Column 6, Line 33, "one, X" should be --one X--.

Column 6, Line 34, "tree" should be --free--;

Column 6, Line 39, "these" should be --those--;

Column 9, Line 16, "iraconic" should be --itaconic--;

Column 13, Line 44, "Egolab" should be --Ecolab--;

Column 15, Line 21, "busing" should be --using--;

Column 16, Line 19, "a – 2.5 hour" should be --a 1-2.5 hour--;

Column 17, Line 47, "1.0 g IOA" should be --51.0 g IOA--;

Column 17, Line 48, "and 5.0 g of charge 111" should be --and 75.0 g of charge 111--;

Column 19, Line 6, "tier" should be --for--;

Column 21, Line 32, "Examples and 37" should be --Examples 36 and 37--;

Column 22, Line 28, "11.3 pans" should be --11.3 parts--;

UNITED STATES PATENT AND TRADEMARK OFFICE
CERTIFICATE OF CORRECTION

PATENT NO.: 5,512,612
DATED: April 30, 1996
INVENTOR(S): Mary L. BROWN, Richard J. GOETZ, Cheryl L. MOORE, Donald R. BATTLES Column 22, Lines 28, 29, "4.5 pans" should be --4.5 parts--;

Column 22, Line 33, "4.5 pans" should be --4.5 parts--;

Column 22, Line 53, "3.57N 50:50" should be --3.57 N 50:50--;

Claim 11, Column 25, Line 30, "wherein; the" should be --wherein the--

Claim 15, Column 25, Line 51, "40 to 5 pans by weight" should be --40 to 5 parts by weight--;

Claim 21-A)(3), Column 26, Line 17, "0 to 40 pans by weight" should be --0 to 40 parts by weight--;

Claim 21-B)(1), Column 26, Line 24, "50 to 98 pans by weight" should be --50 to 98 parts by weight--;

Signed and Sealed this

Nineteenth Day of May, 1998

Attest:

BRUCE LEHMAN

*Attesting Officer*     *Commissioner of Patents and Trademarks*